(12) United States Patent
Ferianz

(10) Patent No.: US 7,365,547 B2
(45) Date of Patent: Apr. 29, 2008

(54) CIRCUIT ARRANGEMENT FOR A CORROSION PROTECTION CURRENT FEED AND FOR A LINE TEST FOR TWO-WIRE LINES

(75) Inventor: Thomas Ferianz, Bodensdorf (AT)

(73) Assignee: Infineon Technologies AG, Munich (DE)

( * ) Notice: Subject to any disclaimer, the term of this patent is extended or adjusted under 35 U.S.C. 154(b) by 60 days.

(21) Appl. No.: 11/356,549

(22) Filed: Feb. 17, 2006

(65) Prior Publication Data

US 2006/0188072 A1 Aug. 24, 2006

(30) Foreign Application Priority Data

Feb. 18, 2005 (DE) ...................... 10 2005 008 158

(51) Int. Cl.
*G01R 31/04* (2006.01)
*G01R 27/08* (2006.01)
*H04M 1/24* (2006.01)
*H04M 3/22* (2006.01)

(52) U.S. Cl. ................... 324/538; 324/700; 379/29.01; 379/1.01

(58) Field of Classification Search ............. 379/29.01, 379/29.03, 29.04
See application file for complete search history.

(56) References Cited

U.S. PATENT DOCUMENTS

| | | | |
|---|---|---|---|
| 4,611,101 A * | 9/1986 | Walter et al. ............ | 379/29.03 |
| 6,212,258 B1 * | 4/2001 | Bella et al. ............... | 379/29.01 |
| 6,453,016 B1 * | 9/2002 | Chea, Jr. .................. | 379/29.01 |
| 6,606,383 B1 * | 8/2003 | Robinson et al. ........... | 379/413 |
| 6,922,464 B2 * | 7/2005 | Bailey ........................ | 379/1.03 |
| 6,978,014 B1 * | 12/2005 | Bentley ...................... | 379/413 |
| 2002/0021787 A1 | 2/2002 | Chea, Jr. | |
| 2002/0094077 A1 * | 7/2002 | Kunisch ................ | 379/387.01 |
| 2002/0196031 A1 * | 12/2002 | Blades ........................ | 324/536 |
| 2005/0078709 A1 * | 4/2005 | Kunisch ..................... | 370/480 |

OTHER PUBLICATIONS

German Office Action dated Nov. 10, 2005.

\* cited by examiner

*Primary Examiner*—Andrew H. Hirshfeld
*Assistant Examiner*—Jeff Natalini
(74) *Attorney, Agent, or Firm*—Jenkins, Wilson, Taylor & Hunt, P.A.

(57) ABSTRACT

A circuit arrangement for a line test and for feeding a corrosion protection current into a two-wire line comprises a controllable ramp generator for producing a ramp voltage, at least one first test impedance to be connected to a first line of a two-wire line, at least one second test impedance to be connected to a second line of the two-wire line, at least one first and second controllable switches for connecting the ramp voltage to the first and second test impedances, and a programmable control device for controlling the ramp generator and the first and second controllable switches in such a way so that the ramp voltage is coupled to the two-wire line in order to produce a corrosion protection current. The control device switches at least one of the first and second test impedances to the respective of the first and second lines for a line test.

17 Claims, 2 Drawing Sheets

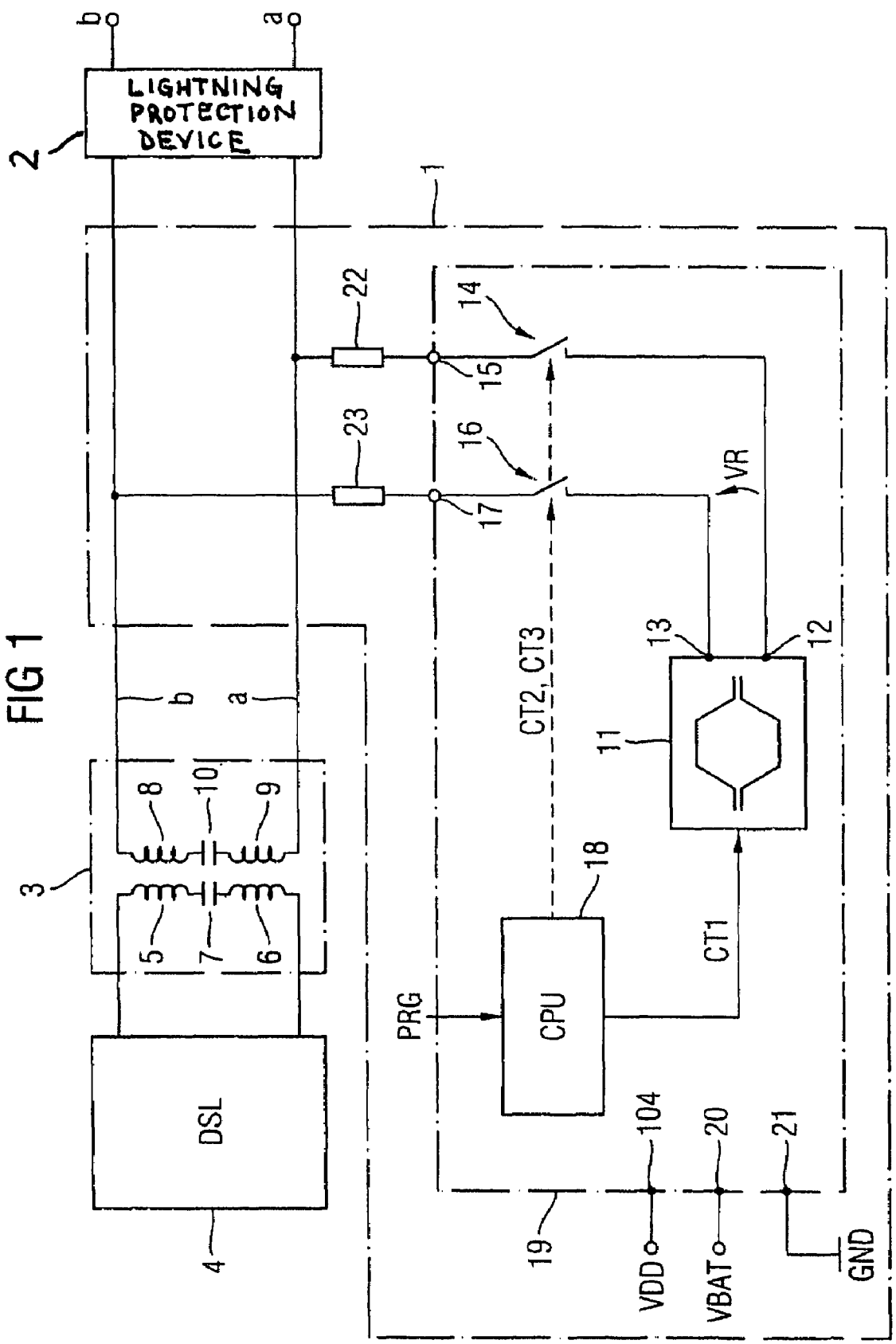

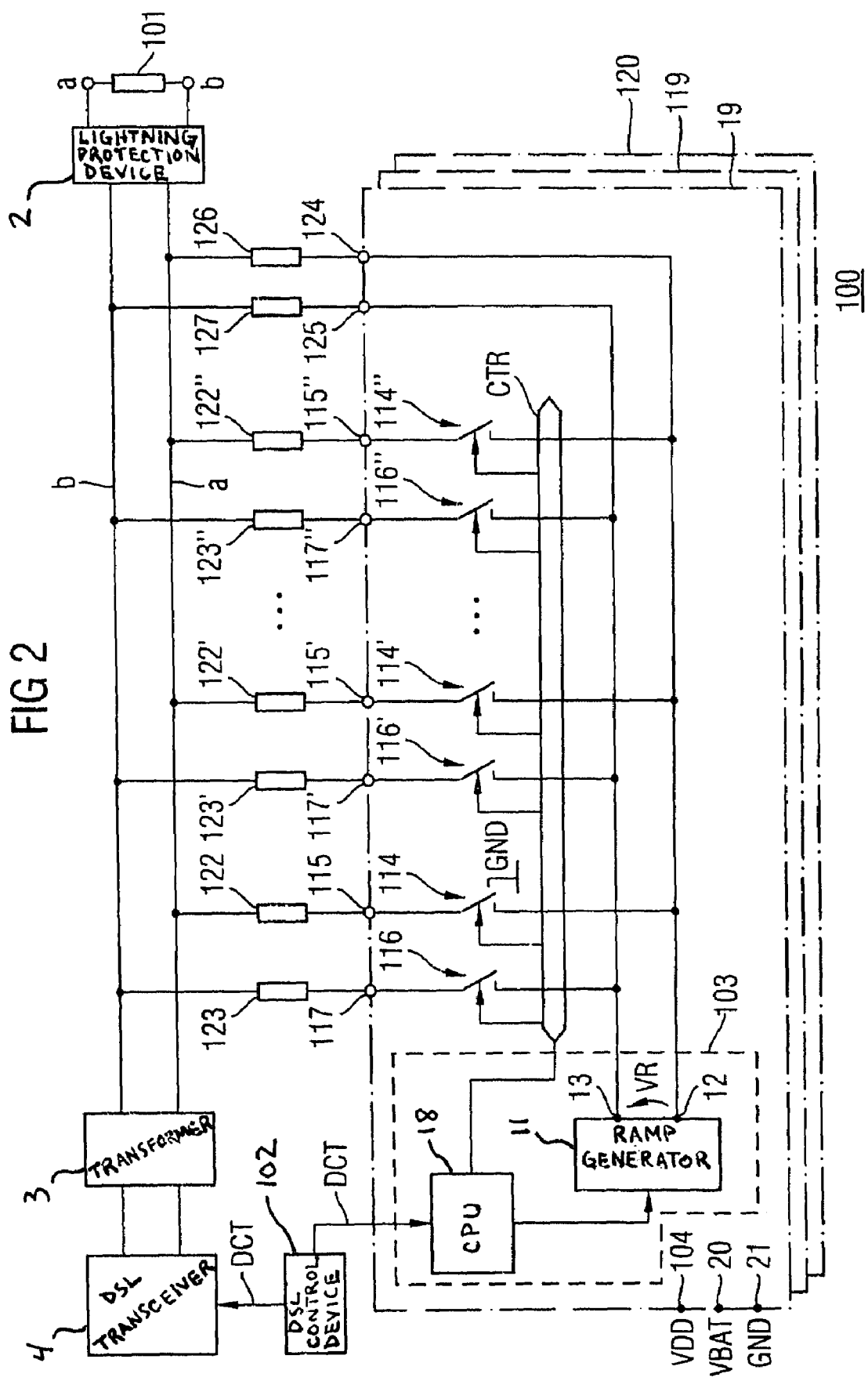

CIRCUIT ARRANGEMENT FOR A CORROSION PROTECTION CURRENT FEED AND FOR A LINE TEST FOR TWO-WIRE LINES

BACKGROUND OF THE INVENTION

1. Field of the Invention

The present invention relates to a circuit arrangement for a line test and for feeding a corrosion protection current into a two-wire line, in particular for use in switching centres for digital telecommunications networks.

2. Description of the Prior Art

Nowadays, telephone networks which were originally designed for telephone applications are increasingly being used exclusively for digital data traffic. The existing two-wire lines are in this case used for transmission of radio-frequency signals which, for example, are at up to 30 MHz for applications. At the switching centre end, DSL systems are coupled to the lines and, in addition to the task of communication organization, also have to test the quality of the two-wire lines.

Possible faults on two-wire lines which can interfere with signal transport are, inter alia, bridged line pairs or individual lines, or single lines of a two-wire line, connected to earth. Line faults such as these change the predetermined impedance of the two-wire line and can thus be identified by means of impedance measurements by the DSL system. In this case, balanced faults such as the bridging of the two individual lines are difficult to distinguish from unbalanced faults, such as an undesirable connection between one of the individual lines via a resistance to earth, since the DSL system is generally coupled to the two-wire line only non-conductively, via a transformer.

In addition to the line qualification and line test of the two-wire lines by means of the switching centre, a corrosion protection current should also be fed into the conductor loops formed from the two-wire lines, at regular time intervals. A corrosion protection current such as this, which is also known as a sealing current, is used to break through thin oxide layers or other layers that constrict the current flow at junction points between line sections on lines which are composed, for example, of copper, in order to ensure a reliable electrical connection over the entire respective conductor loop. For present-day telecommunications networks, standard requirements of 1.5-20 mA are quoted for a direct current such as this for corrosion protection.

SUMMARY OF THE INVENTION

It is an object of the present invention to provide a means of feeding corrosion protection currents into two-wire line systems that is simple and occupies little area.

The object is achieved in accordance with the invention by means of a circuit arrangement, comprising a controllable ramp generator for production of a ramp voltage, at least one first test impedance which is connected to a first line of the two-wire line, and a second test impedance which is connected to a second line of the two-wire line. At least one first and one second controllable switch are provided for connecting the ramp voltage to the first and second test impedance, a programmable control device for controlling the ramp generator and the controllable switches, with the control device controlling the controllable switches and the ramp generator in such a way that the ramp voltage is coupled to the two-wire line in order to produce a corrosion protection current. In this case, furthermore, the control device connects the first and/or second test impedance to the first and/or second line for the line test.

One major idea on which the invention is based is to inject a corrosion protection direct current into the conductor loop of the two-wire line by means of the ramp generator and the test impedances, in which case the test impedances which, for example, may be in the form of resistors may be switched individually. This also makes it possible to identify line faults which may be of both a balanced or unbalanced nature, such as an individual line connected to earth, during a line test in which test signals are injected into the two-wire line from a DSL transceiver. This is particularly advantageous in the case of completely digital systems (ADL; ADL=All Digital Loop), since there is no analogue telephone system conductively coupled to the two-wire line by means of which a line test can be carried out. Since the DSL devices are generally coupled to the corresponding line pair non-conductively via a transformer, only balanced line faults, such as a bridged two-wire line, can be detected in a line test without test impedances according to the invention. According to the invention, both the protection current feed and the connection of the test impedances can now be implemented as aids to the line test with a single chip.

The programmable control device, the ramp generator and the controllable switches may be in the form of an integrated semiconductor module, and the test impedances may be in the form of discrete resistors. The discrete form of the test impedances in the form of resistors means that there are scarcely any power losses within the integrated circuit so that, for example, a plurality of circuit arrangements according to the invention can be accommodated on one semiconductor chip, and can thus control a large number of two-wire lines. In comparison to the prior art, in which integrated current sources are generally used, an integrated embodiment according to the invention results in reduced power losses.

In a restricted version of the inventive circuit arrangement, a first non-switchable high-value feed resistor is connected to the first line second non-switchable high-value feed resistor is connected to the second line, in order to feed the corrosion protection current into a conductor loop of the two-wire line. In order to satisfy specific test requirements for the magnitudes of the test impedances, it may be necessary to inject the sealing current via high-value feed resistors and in fact to connect low-value test impedances to the lines for the line test.

The ramp generator is preferably controlled in such a way that a ramp voltage of a respective rising ramp voltage signal rises with time in such a manner that no harmonics of the ramp voltage signal occur in the DSL frequency range. In order that feeding in the corrosion protection current does not interfere with data transmission via the two-wire line, no frequencies should be produced in the DSL frequency range (particularly when switching on or ramping up the ramp voltage) and the Fourier spectrum of the corresponding ramp voltage signal have only minor, non-interfering frequency components in the transmission range of the respective data transmission application.

A plurality of first and second test impedances having different impedance values are preferably provided. Different resistors can thus also be connected successively to the individual lines of the two-wire line thus making it possible, in particular, to detect unbalanced faults on the two-wire line. For this purpose, different test impedances should preferably be connected successively to the lines of the two-wire line, controlled by the control devices for the line test, with one respective test impedance in each case being connected to a reference potential, to a further test impedance or to the ramp generator. The injection of a known disturbance, specifically a test impedance at a known reference potential, makes it possible for a connected DSL device to identify an initially unknown fault on the two-wire line.

An internal control bus may be provided in order to control the controllable switches in the semiconductor module.

The object is also achieved in accordance with the invention by means of a DSL system for transmission of data via at least one two-wire line, comprising a DSL transceiver which is coupled to the two-wire line via a transformer, a DSL control device, and at least one circuit arrangement according to the invention, with the DSL control device controlling the control device for the circuit arrangement via a DSL control bus with test signals being injected into the two-wire line in order to test the two-wire line and evaluating the DSL signals, received by the DSL transceiver, from the two-wire line.

A large number of circuit arrangements can advantageously be arranged in the inventive DSL system on one linecard with a linecard controller as the DSL control device.

At least one further first test impedance may be connected to a first line of a further two-wire line, and a second test impedance is connected to a second line of the further two-wire line; at least one first and second further controllable switch is provided in order to connect the ramp voltage to the first and to the second further test impedance. In this case, the control device for the at least one circuit arrangement according to the invention, as the central control device, controls the controllable switches and the further controllable switches, and the ramp generator for the at least one circuit arrangement according to the invention, as the central ramp voltage generator, produces a ramp voltage. The DSL system designed in this way can thus be used to provide a large number of two-wire lines with corrosion protection currents, and to carry out line tests, with little complexity.

Furthermore, different test impedances and test signals may preferably be coupled to the two-wire line successively in order to identify an unbalanced line fault on the respective two-wire line. Then, it is possible to use multiple channel modules with advantageous housings since there are scarcely any power loses in the circuit arrangements according to the invention. In fact, the test impedances can also be in the form of discrete resistors, and can be coupled to the corresponding semiconductor chip, with little complexity. Although the DSL transceiver in the inventive DSL system is coupled to the two-wire line via a transformer, which represents a high-pass filter, unbalanced faults can also be identified in the two-wire line since, according to the invention, the control devices for the integrated circuit arrangements according to the invention are programmed and controlled-by the linecard controller, and test impedances can thus be connected to the individual two-wire lines individually.

DESCRIPTION OF THE DRAWINGS

FIG. 1 is an exemplary inventive circuit arrangement.
FIG. 2 is an exemplary inventive DSL system.

DESCRIPTION OF THE PREFERRED EMBODIMENTS

Unless stated to the contrary, identical or functionally identical components have been provided with the same reference symbols in the figures.

FIG. 1 shows a circuit arrangement 1 according to the invention.

The illustration shows a two-wire line a, b which passes through a lightning protection device 2 and is connected to a transformer 3 at the switching centre end. A DSL transceiver 4 is connected to the transformer 3. In this case, the transformer 3 is used essentially as a high-pass filter and has inductances 5, 6, which are connected in series on a first winding side, and a capacitance 7. The transformer 3 likewise has inductances 8, 9, which are connected in series on the second winding side, and a capacitance 10. The actual DSL system or the DSL transceiver 4 is thus DC-isolated from the two-wire line a, b.

The circuit arrangement 1 according to the invention has a controllable ramp generator 11 for production of a ramp voltage VR at two voltage connections 12, 13, a first controllable switch 14 which is connected between the first voltage connection 12 and a test connection 15, and has a second controllable switch 16, which is connected between the second voltage connection 13 and a second test connection 17. The two controllable switches 14, 16 and the ramp generator 11 are controlled by a programmable control device 18, which supplies corresponding control signals CT1, CT2, CT3 to the switches 14, 16 and to the ramp generator 11.

In the exemplary embodiment described here, the programmable control device 18, the controllable switches 14, 16 and the ramp generator 11 are in an integrated form on a semiconductor module 19. This semiconductor module is supplied with supply voltage potentials VDD and GND via appropriate supply voltage connections 20, 21. Normally, the supply voltage used is VBAT=−48 V and GND=0 V, or earth, since these are frequently used for feeding telephone two-wire lines. In DSL applications, a lower, second supply voltage VDD of about 3.3 V is generally also provided, and in this case is passed to a further connection 104. This lower voltage VDD is advantageously used for supplying voltage to the control device 18 and to the switches 14, 16, while the ramp voltage is advantageously obtained from the battery voltage VBAT. However, alternative voltage combinations are also feasible, or specific voltage sources can be used.

A first resistor 22 is connected as a test impedance between the first test connection 15 and the first individual line a of the two-wire line a, b, and a second resistor 23 is connected as a test impedance between the second test connection 17 and the second individual line b of the two-wire line a, b.

The circuit arrangement 1 according to the invention advantageously carries out two functions, specifically on the one hand of feeding a corrosion protection current into the conductor loop a, b, while on the other hand of allowing the efficient testing of the conductor loop for line faults.

In order to feed in a corrosion protection current, the two controllable switches 14, 16 are closed, and the ramp generator 11 produces a slowly rising voltage VR at its voltage connections 12, 13, producing a current flow via the first resistor 22 into the second individual line b, via a subscriber modem (which is not illustrated here) with a predetermined terminating resistance, the second individual line a and the second resistor 23. This corrosion protection current is a direct current which breaks through any dirt or oxide layers which may have been precipitated at contact points on or at the two-wire lines a, b, thus reproducing good electrical conductivity. Contact points such as these occur in particular at plug connections, or in general at junctions of dissimilar materials, for example between copper and alloys or noble metals, in the two-wire loop. Without a direct current such as this for corrosion protection, which is fed into the conductor loop a, b regularly by the control device 18, thin insulating layers such as these could lead to line faults. It is normally sufficient to raise the sealing current or corrosion protection current for a few minutes per day.

The signal form of the ramp voltage must in this case be chosen such that no radio-frequency components or harmonics of the corresponding ramp voltage signal occur in frequency ranges of data transmission methods, which could thus interfere with simultaneous data transmission. For this purpose, it is also possible to choose sinusoidally rising signal forms or other known signal forms which can be raised and generated easily. Ramp voltages which rise exponentially, linearly or in accordance with a square law are mentioned here only by way of example.

The two-wire lines a, b normally intrinsically have specific noise values of, for example, −140 dBm/Hz for their data transmission function, that is to say an extremely low power density, as noise. The signal form of the ramp voltage must therefore be chosen such that radio-frequency components of the ramp voltage signal cause at most a power density such as this on the two-wire line.

According to the invention, the circuit arrangement 1 is also used to assist a line test for example by means of the DSL transceiver 4. In this case, the DSL transceiver 4 sends test signals into the two-wire line a, b via the transformer 3, and receives echo signals. If the two-wire line is faulty, for example as a result of a balanced fault such as bridging between the two individual lines a, b of the two-wire line a, b, the impedance changes, and this can be detected by the DSL transceiver 4. Since, however, the DSL transceiver 4 is coupled non-conductively to the conductor loop a, b, unbalanced faults such as coupling of only one of the individual lines a, b to a fault potential, for example earth via a fault resistance, cannot be identified. However, according to the invention, this can be achieved by connection of test impedances or of the two resistors 22, 23. This is because the resistors 22, 23, of magnitudes as known, produce known impedance changes in the two-wire line a, b. Since the resistors 22, 23 can be connected to the circuit arrangement 1 individually by the controllable switches 14, 16 in the integrated part 19, it is also possible to detect unbalanced fault influences on the conductor loop a, b. The advantages of the circuit arrangement 1 according to the invention are particularly clear when used in a DSL system.

A DSL system 100 according to the invention is illustrated in FIG. 2.

The DSL system 100 has a DSL transceiver 4, a transformer 3 and a lightning protection apparatus 2, which are coupled to the two-wire line a, b. At the subscriber end TS, a subscriber modem, which in this case is illustrated as a terminating resistance 101, is coupled to the two-wire line a, b. A circuit arrangement 19 according to the invention in the form of an integrated semiconductor chip is provided and has a first, a second and a third supply voltage connection 20, 21, 104, to which a battery voltage VBAT, a lower, second supply voltage VDD and earth GND are connected.

The semiconductor module 19 also has a programmable control device 18, a ramp generator 11 and a large number of first controllable switches 114, 114', 114" and second controllable switches 116, 116', 116". The controllable switches are actuated via an internal control bus CTR by the control device 18.

The controllable switches are in this case arranged in such a way that the ramp voltage VR which is produced by the ramp voltage generator 11 at voltage connections 12, 13 can be connected to first and second test connections 115, 115', 115", 117, 117', 117". Furthermore, first and second switches 114, 116, 114', 116', 114", 116" can respectively connect the respective test connections 115, 117, 115', 117', 115", 117" to one another. GND earth can also be connected to the test connections 115, 115', 115", 117, 117', 117" via the controllable switches 114, 114', 114", 116, 116', 116".

A respective resistor 122, 122', 122" is connected as a test impedance between the first test connections 115, 115', 115" and the first line a of the two-wire line a, b. A respective second resistor 123, 123', 123" is connected, likewise as a test impedance, between the second test connections 117, 117', 117" and the second line b of the two-wire line a, b. The resistors 122, 123, 122', 123', 122", 123" in this case each have identical impedances, in pairs.

Furthermore, the ramp voltage VR can be tapped off directly at two ramp voltage connections 124, 125 of the integrated part 19 of the circuit arrangement according to the invention. A first non-switchable, high-value feed resistor 126 is thus connected between the first ramp voltage connection 124 and the first line a, and a second feed resistor 127 is connected between the second ramp voltage connection 125 and the second line b of the two-wire line a, b.

The resistors 122, 122', 122", 123, 123', 123", 126, 127 are in this case in a discrete form in order to advantageously dissipate any possible power losses. The integrated part 19 can thus particularly efficiently be in the form of a semiconductor chip. Finally, a DSL control device 102 is provided, controlling both the DSL transceiver 4 and the control device 18.

According to the invention, a plurality of circuit arrangements can also be arranged on a linecard, which then controls a large number of two-wire lines, and not only supplies a corrosion protection current but also qualifies these lines and carries out line tests. This is only indicated in FIG. 2. A central linecard controller as the DSL control device 102 then controls the circuit arrangements according to the invention for the line test and for feeding the corrosion protection currents into the respective two-wire lines. The corresponding programmable control devices 18, ramp generators 11 and controllable switches 114, 114', 114", 116, 116', 116" are then in the form of a single integrated semiconductor module 19, 119, 120.

In the DSL system 100 illustrated in FIG. 2, the DSL control device 102 instructs the transceiver 3 to inject test signals into the corresponding two-wire line a, b while, controlled by the control device 18, various test impedances 122, 122', 122", 123, 123', 123" are coupled to the lines a, b of the two-wire line a, b, or are connected to one another in pairs, by which means the two-wire lines are bridged via the respective first and second test impedance 122, 123. The latter results in the impedance of the two-wire line a, b being varied, and causes echo signals which are in turn identified by the transceiver 4.

Furthermore, it is also possible to determine by connection of individual resistors or individual test impedances whether there are any unbalanced line faults. For example, it is possible to couple test impedances of different magnitudes successively to only one of the two lines of the two-wire line a, b, or to connect only one of the lines to earth via a test impedance.

In order to allow specific faults to be found during a line test, particularly low test impedances are required in many cases. These are not always suitable for feeding in the corrosion protection current since an excessively high current level may possibly be produced. In the embodiment described here, the two feed resistors 126, 127 which are designed to have high value are therefore provided and provide a corrosion protection current of about 2 mA with, for example, a typical terminating resistance 101 of 10 kQ in a subscriber modem. The feed resistors 126, 127 are also chosen to have sufficiently high values such that they do not significantly connect either of the two individual lines a, b via the ramp generator 11, or change the impedance of the two-wire line a, b.

The circuit arrangement according to the invention or the DSL system according to the invention thus makes it possible to feed in corrosion protection currents with little complexity, and to qualify the two-wire lines easily with little complexity, by means of the connection of test impedances. The combination of a controlled, integrated ramp generator with external test impedances and feed resistors allows linecards to be fitted with chips that can be produced easily, so that the linecards can be produced easily because the power losses from the integrated circuit parts are low. The invention is particularly suitable for new types of completely digital systems which, in principle, no longer have any conductive coupling to the two-wire line, as was previously the case in telephone switching centres.

Although the present invention has been described above with reference to preferred exemplary embodiments, it is not restricted to them but can be modified in many ways. The ramp generator need not necessarily produce a linear voltage rise as the ramp voltage signal, but can likewise produce other signal forms which do not contain radio-frequency harmonics which could interfere with the data transmission on the two-wire line.

Furthermore, the circuit according to the invention can be modified in such a way that a central control device and a central ramp generator control a plurality of controllable switches, and respectively produces a ramp voltage for a plurality of two-wire lines. An integrated circuit can then be designed to which discrete test impedances and, possibly, feed resistors are connected, and these are coupled to corresponding two-wire lines. In this case, it is feasible, by way of example, to provide two switchable test resistors and two feed resistors for each line pair.

Furthermore, the invention is not restricted to a DSL system but can in principle be used in all feasible two-wire line systems.

Although modifications and changes may be suggested by those skilled in the art, it is the intention of the inventor to embody within the patent warranted heron all changes and modifications as reasonably and properly come within the scope of his contribution to the art.

I claim as my invention:

1. A circuit arrangement for a line test and for feeding a corrosion protection current into a two-wire line, comprising:
    a controllable ramp generator for producing a ramp voltage;
    at least one first test impedance to be connected between a first line of a two-wire line and a first voltage connection of said controllable ramp generator;
    at least one second test impedance to be connected between a second line of said two-wire line and a second voltage connection of said controllable ramp generator;
    at least one first and second controllable switch for connecting said ramp voltage to said first and second test impedances; and
    a programmable control device for controlling said ramp generator and said first and second controllable switches in such a way so that said ramp voltage is coupled to said two-wire line through said first and second test impedances in order to produce a corrosion protection current; said control device switching at least one of said first and second test impedances to the respective of said first and second lines for a line test.

2. The circuit arrangement of claim 1, wherein said programmable control device, said ramp generator, and said first and second controllable switches are combined to one integrated semiconductor module, and said first and second test impedances are discrete resistors.

3. The circuit arrangement of claim 2, comprising an internal control bus in order to control said first and second controllable switches in said semiconductor module.

4. The circuit arrangement of claim 1, wherein a non-switchable first feed resistor with a high resistance is connected to said first line and a non-switchable second feed resistor with a high resistance is connected to said second line in order to feed said corrosion protection current into a conductor loop of said two-wire line.

5. The circuit arrangement of claim 1, wherein said ramp generator is controlled in such a way that a ramp voltage of a respective rising ramp voltage signal rises with time in such a manner that said ramp voltage comprises no harmonics within a DSL frequency range.

6. The circuit arrangement of claim 1, comprising several first test impedances having different impedance values and several second test impedances having different impedance values.

7. The circuit arrangement of claim 1, comprising several first test impedances and several second test impedances; wherein different of said several first and second test impedances, controlled by said control device, are connected successively to said first and second lines of said two-wire line for said line test and wherein at least some of said different first impedances are connected to a reference potential, to a further of said first test impedances or to said ramp generator and wherein at least some of said different second impedances are connected to said reference potential, to a further of said second test impedances or to said ramp generator.

8. A DSL system for transmitting data via at least one two-wire line, comprising:
    a DSL transceiver to be coupled to a two-wire line via a transformer;
    a DSL control device; and
    at least one circuit arrangement, being comprised of a controllable ramp generator for producing a ramp voltage; at least one first test impedance to be connected between a first line of a two-wire line and a first voltage connection of said controllable ramp generator; at least one second test impedance to be connected between a second line of said two-wire line and a second voltage connection of said controllable ramp generator; at least one first and second controllable switch for connecting said ramp voltage to said two-wire line through said first and second test impedances; and a programmable control device for controlling said ramp generator and said first and second controllable switches in such a way so that said ramp voltage is coupled to said two-wire line in order to produce a corrosion protection current; said control device switching at least one of said first and second test impedances to the respective of said first and second lines for a line test; and
    said DSL control device controlling said control device of said circuit arrangement via a DSL control bus, injecting test signals into said two-wire line in order to test said two-wire line and evaluating DSL signals received from said DSL transceiver via said two-wire line.

9. The DSL system of claim 8, wherein said programmable control device, said ramp generator, and said first and second controllable switches are combined to one integrated semiconductor module, and said first and second test impedances are discrete resistors.

10. The DSL system of claim 9, comprising an internal control bus in order to control said first and second controllable switches in said semiconductor module.

11. The DSL system of claim 8, wherein a non-switchable first feed resistor with a high resistance is connected to said first line and a non-switchable second feed resistor with a high resistance is connected to said second line in order to feed said corrosion protection current into a conductor loop of said two-wire line.

12. The DSL system of claim 8, wherein said ramp generator is controlled in such a way that a ramp voltage of a respective rising ramp voltage signal rises with time in such a manner that said ramp voltage comprises no harmonics within a DSL frequency range.

13. The DSL system of claim 8, wherein said at least one circuit arrangement comprises several first test impedances having different impedance values and several second test impedances having different impedance values.

14. The DSL system of claim 8, wherein said at least one circuit arrangement comprises several first test impedances and several second test impedances; wherein different of said several first and second test impedances, controlled by said control device, are connected successively to said first and second lines of said two-wire line for said line test and wherein at least some of said different first impedances are connected to a reference potential, to a further of said first test impedances or to said ramp generator and wherein at least some of said different second impedances are connected to said reference potential, to a further of said second test impedances or to said ramp generator.

15. The DSL system of claim 8, comprising a linecard with a linecard controller and a plurality of said circuit arrangements arranged on said linecard; said linecard controller being said DSL control device.

16. The DSL system of claims 8, wherein said at least one circuit arrangement comprises several first test impedances having different impedance values and several second test impedances having different impedance values; different of said first and second test impedances being coupled successively to said two-wire line and said ramp generator generating successively different test signals in order to identify an unbalanced line fault of said two-wire line.

17. A DSL system for transmitting data via at least one two-wire line, comprising:

a DSL transceiver to be coupled to a two-wire line via a transformer;

a DSL control device; and at least one circuit arrangement, being comprised of a controllable ramp generator for producing a ramp voltage; at least one first test impedance to be connected to a first line of a two-wire line; at least one second test impedance to be connected to a second line of said two-wire line; at least one first and second controllable switch for connecting said ramp voltage to said first and second test impedances; and a programmable control device for controlling said ramp generator and said first and second controllable switches in such a way so that said ramp voltage is coupled to said two-wire line in order to produce a corrosion protection current; said control device switching at least one of said first and second test impedances to the respective of said first and second lines for a line test;

at least one further first test impedance to be connected to a first line of a further two-wire line;

at least one further second test impedance to be connected to a second line of said further two-wire line; and at least one first and second further controllable switch in order to connect said ramp voltage to said first and to said second further first and second test impedances; said control device of said at least one circuit arrangement being a central control device controlling said first and second controllable switches and said first and second further controllable switches, and said ramp generator of said at least one circuit arrangement being a central ramp voltage generator producing said ramp voltage;

said DSL control device controlling said control device of said circuit arrangement via a DSL control bus, injecting test signals into said two-wire line in order to test said two-wire line and evaluating DSL signals received from said DSL transceiver via said two-wire line.

* * * * *